United States Patent
Fröhlich et al.

(10) Patent No.: US 8,230,398 B2
(45) Date of Patent: Jul. 24, 2012

(54) MONITORING A SOFTWARE SYSTEM BASED ON A SERVICE ORIENTED ARCHITECTURE

(75) Inventors: Andreas Fröhlich, Darmstadt (DE);
Harald Schöning, Dieburg (DE);
Juliane Harbarth, Griesheim (DE);
Michael Gesmann, Darmstadt (DE)

(73) Assignee: Software AG, Darmstadt (DE)

( * ) Notice: Subject to any disclaimer, the term of this patent is extended or adjusted under 35 U.S.C. 154(b) by 1225 days.

(21) Appl. No.: 12/014,182

(22) Filed: Jan. 15, 2008

(65) Prior Publication Data
US 2008/0172654 A1  Jul. 17, 2008

(30) Foreign Application Priority Data
Jan. 15, 2007  (EP) ..................... 07000683

(51) Int. Cl.
*G06F 9/44* (2006.01)
*G06F 3/00* (2006.01)
(52) U.S. Cl. .............. 717/127; 717/124; 719/313
(58) Field of Classification Search .......... 717/100, 717/120–135; 714/37, 38; 719/313–317
See application file for complete search history.

(56) References Cited

U.S. PATENT DOCUMENTS

| | | | |
|---|---|---|---|
| 6,144,967 A * | 11/2000 | Nock ................. | 1/1 |
| 7,293,010 B2 * | 11/2007 | Angele et al. .......... | 1/1 |
| 7,487,166 B2 * | 2/2009 | Angele et al. .......... | 1/1 |
| 7,607,136 B2 * | 10/2009 | Kuno et al. ............ | 719/315 |
| 7,797,406 B2 * | 9/2010 | Patel et al. ............ | 709/220 |
| 7,979,569 B2 * | 7/2011 | Eisner et al. .......... | 709/231 |
| 2004/0054690 A1 * | 3/2004 | Hillerbrand et al. ..... | 707/104.1 |
| 2005/0091386 A1 * | 4/2005 | Kuno et al. ........... | 709/228 |
| 2005/0216241 A1 * | 9/2005 | Entin et al. ........... | 703/2 |
| 2006/0053098 A1 * | 3/2006 | Gardner et al. ......... | 707/3 |
| 2006/0074833 A1 * | 4/2006 | Gardner et al. ......... | 706/45 |
| 2006/0167856 A1 * | 7/2006 | Angele et al. .......... | 707/3 |
| 2006/0173868 A1 * | 8/2006 | Angele et al. .......... | 707/100 |
| 2007/0033194 A1 * | 2/2007 | Srinivas et al. ......... | 707/10 |
| 2007/0165625 A1 * | 7/2007 | Eisner et al. .......... | 370/389 |

(Continued)

FOREIGN PATENT DOCUMENTS

EP   1 684 192   7/2006

(Continued)

OTHER PUBLICATIONS

Gunter et al, "Dynamic Monitoring of High-Performance Distributed Applications", High Performance Distributed Computing, Proceedings of 11th IEEE International Symposium, Jul. 23-26, 2002, Piscataway, NJ, USA, pp. 163-170.

(Continued)

*Primary Examiner* — Wei Zhen
*Assistant Examiner* — Qing Chen
(74) *Attorney, Agent, or Firm* — Meyertons Hood Kivlin Kowert & Goetzel, P.C.; Jeffery C. Hood; Joel L. Stevens

(57) ABSTRACT

Monitoring a software system based on a service oriented architecture (SOA). The method may involve system components communicating with each other via sending messages. The method may include receiving a monitoring message by a monitoring component where the monitoring message may be sent from a system component of the software system. The method may further include providing an ontology including at least one interpretation rule for the message by the monitoring component. The method may also include reacting of the monitoring component in accordance with the at least one interpretation rule.

23 Claims, 3 Drawing Sheets

Monitoring System

U.S. PATENT DOCUMENTS

Figure 1:
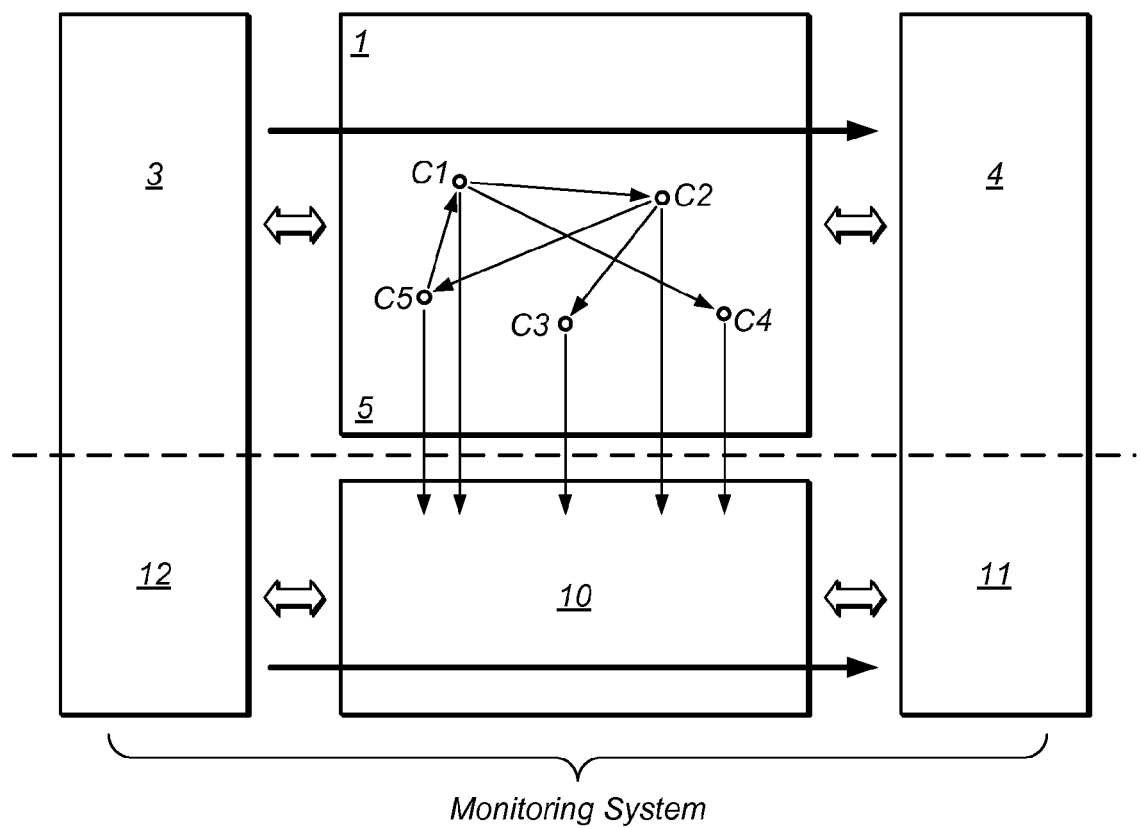

| | | | |
|---|---|---|---|
| 2007/0168301 A1* | 7/2007 | Eisner et al. | 705/79 |
| 2007/0171923 A1* | 7/2007 | Eisner et al. | 370/401 |
| 2007/0171924 A1* | 7/2007 | Eisner et al. | 370/401 |
| 2007/0180150 A1* | 8/2007 | Eisner et al. | 709/246 |
| 2007/0198437 A1* | 8/2007 | Eisner et al. | 705/79 |
| 2008/0025230 A1* | 1/2008 | Patel et al. | 370/252 |
| 2008/0127111 A1* | 5/2008 | Perlman et al. | 717/128 |

FOREIGN PATENT DOCUMENTS

| | | |
|---|---|---|
| EP | 1 686 495 | 8/2006 |
| EP | 1 742 157 | 1/2007 |
| WO | 03/034183 | 4/2003 |

OTHER PUBLICATIONS

Gulcu, "Short Introduction to log4j", Apache Software Foundation, pp. 1-14, retrieved from the Internet: http://logging.apache.org/log4j/1.2/manual.html; Mar. 2002.

European search report for application No. EP 07 00 0683, search completed Oct. 23, 2007.

* cited by examiner

MONITORING A SOFTWARE SYSTEM BASED ON A SERVICE ORIENTED ARCHITECTURE

PRIORITY CLAIM

This application claims benefit of priority of European application no. 07 000 683.8 titled "Method and System for Monitoring a Software System", filed Jan. 15, 2007, and whose inventor is Andreas Fröhlich, Dr. Harald Schöning, Juliane Harbarth and Dr. Michael Gesmann.

INCORPORATION BY REFERENCE

European application no. 07 000 683.8 titled "Method and System for Monitoring a Software System", filed Jan. 15, 2007, and whose inventor is Andreas Fröhlich, Dr. Harald Schöning, Juliane Harbarth and Dr. Michael Gesmann, is hereby incorporated by reference in its entirety as though fully and completely set forth herein.

TECHNICAL FIELD

The present application relates to a method and a system for monitoring a software system, in particular for monitoring a software system based on a service oriented architecture.

DESCRIPTION OF THE RELATED ART

Monitoring a software system is an important technical task to assure that the system operates as desired. This applies not only to the development stage of a software system, when the source code repeatedly needs to be debugged, but also to the deployment phase, when exceptional runtime situations must be controlled or the performance of the system is to be evaluated for maintenance or other purposes. In its simplest form, monitoring is just a log-producing device noticing actions occurring in the system, manifesting the actions as a log-entry, and adding the entries to a log. In a much broader sense, monitoring can be anything that looks at what is going on and reacts thereupon. Looking at what is going on may include the ability to obtain information about a system's current status and its history.

Traditionally, monitoring a software system comprises the generation of one or more log files according to some fixed, predetermined rules of the monitoring system. Events are logged, possibly together with corresponding timestamps, so that the later inspection of such a log file allows understanding the sequence of events as they occurred in the software system during runtime. In a more advanced alternative, the monitoring process can be controlled using a configuration file, such as the configuration file for the Log4j project, which determines at runtime, what information is written to a log file. However, the logging options provided by such a configuration file are limited to a predetermined logger hierarchy and therefore provides only a very limited amount of flexibility.

Over the years, software systems have become more complex, which makes monitoring difficult. More important, the concept of a service oriented architecture (SOA) has been increasingly used, wherein loosely coupled components, such as web services, are performing the processing by exchanging messages. An SOA is ideally adaptable to changes with respect to both logical changes of the processing flow and changes of the underlying technical implementation.

However, using the above described traditional approach for monitoring the messages exchanged during the operation of an SOA based software system (or any other system of similar flexibility and complexity), requires an adaptation of the whole monitoring system, whenever any changes are made to the format or content of any message to be logged. As a result, the main advantage of using a SOA, namely its flexibility, is essentially lost if the traditional monitoring approach of the prior art is used, wherein the monitoring is determined by a set of more or less fixed rules implemented into the monitoring system. Furthermore, repeated changes of the monitoring system also affect the resulting log file(s) so that its inspection and understanding becomes more and more difficult. Thus, improvements in monitoring a software system (e.g., an SOA software system) are desired.

SUMMARY OF THE INVENTION

Various embodiments are presented of a method for monitoring a service oriented architecture (SOA).

The method may include receiving a monitoring message by a monitoring component, where the monitoring message may be sent from a system component of the software system. The method may further include providing an ontology comprising at least one interpretation rule for the monitoring message by the monitoring component. Additionally, the method may include the monitoring component reacting in accordance with the at least one interpretation rule.

Accordingly, the monitoring method may use an ontology-based approach instead of a fixed set of monitoring rules permanently implemented in one way or the other into the monitoring component itself. Changing the ontology allows to dynamically adapt the monitoring rules without having to change the monitoring component itself.

In some embodiments, the format and content of the messages exchanged by the components of the software system may be determined by another or the same ontology. In such a system, wherein the software components are loosely coupled and only communicate via sending messages, a higher degree of flexibility may be achieved when the messages exchanged do not have a fixed format. On the contrary, the message content and format can dynamically be agreed upon using an ontology available to all components in the system. Since the monitoring method may similarly use monitoring messages based on an ontology (possibly an extension of the same ontology as used by the SOA to be monitored), it is as flexible as such a SOA itself.

The ontology may be defined using at least one of the ontology languages OWL, RDF, DAML-OIL and Topic Maps (which are described under "http://www.w3.org" and "www.topicmaps.org"), among others. As used herein, the term "ontology" is used to mean an implementation for establishing the concepts of objects and classes with properties and relations among each other to model a subset of the world that is necessary for the task at hand.

In some embodiments, the at least one interpretation rule of the ontology may be used to determine whether information is logged by the monitoring component and/or in which format the information is logged by the monitoring component. Therefore, the whole monitoring process may be determined or driven by the ontology.

In one embodiment, the information may be logged in a permanent log and a temporary log. A temporary log may, for example, comprise information about a pending process such as the beginning of the process, whereas the permanent log may only comprise information about finished processes.

In one embodiment, the reacting of the monitoring component may include modifying the ontology. For example, patterns the monitoring component is looking for may change and the changes may depend on knowledge gained by examining previous processes. Using an ontology with interpretation rules, which can be dynamically changed, may allow for this kind of feedback.

The monitoring message sent from the system component of the software system to the monitoring component may include a unique identifier of a type of an event to be logged. This may enable mechanisms described further below to refer to log entries using this identifier.

Additionally, a method is provided for querying a log created using any of the above described methods. The method may include receiving a query message for content of the log by the monitoring component, the query being in accordance with at least one rule of an ontology accessible by the monitoring component. The method may further include mapping the query message into a query format suitable for the log, the mapping being based (possibly) on at least one rule of another or the same ontology accessible by the monitoring component. Furthermore, the method may include executing the query and returning the results after mapping them into an output format based on the ontology or the ontologies accessible by the monitoring system.

Accordingly, obtaining information from the log, e.g., reading the log, may again driven by one or more ontologies, wherein the ontologies may be an extension to the other, above mentioned ontologies or a separate ontology accessible by the monitoring component. Since the content and structure of the log entries flexibly depend on ontologies, it is impossible to understand the relationships between log entries without additional input. In other words, the log may not be asked directly, but questions may be asked to the monitoring component, which may consult the ontologies knowledge base for the exact data structure the logs are provided in so that the original query can be correspondingly mapped.

In some embodiments, the query message may be received as an XQuery message and the ontology or the ontologies may include at least one XML Schema defining the data structures for the query message and/or the query format suitable for the log.

Finally, the present invention provides a monitoring system which may be adapted to perform any of the above described methods. Such a monitoring system may either be part of the overall software system or can separately be provided. The monitoring system can be realized by hardware and/or software (e.g., as program instructions stored on a memory medium), for example by a suitable computer program with instructions for performing the technical steps outlined above.

SHORT DESCRIPTION OF THE DRAWINGS

Figure 2:
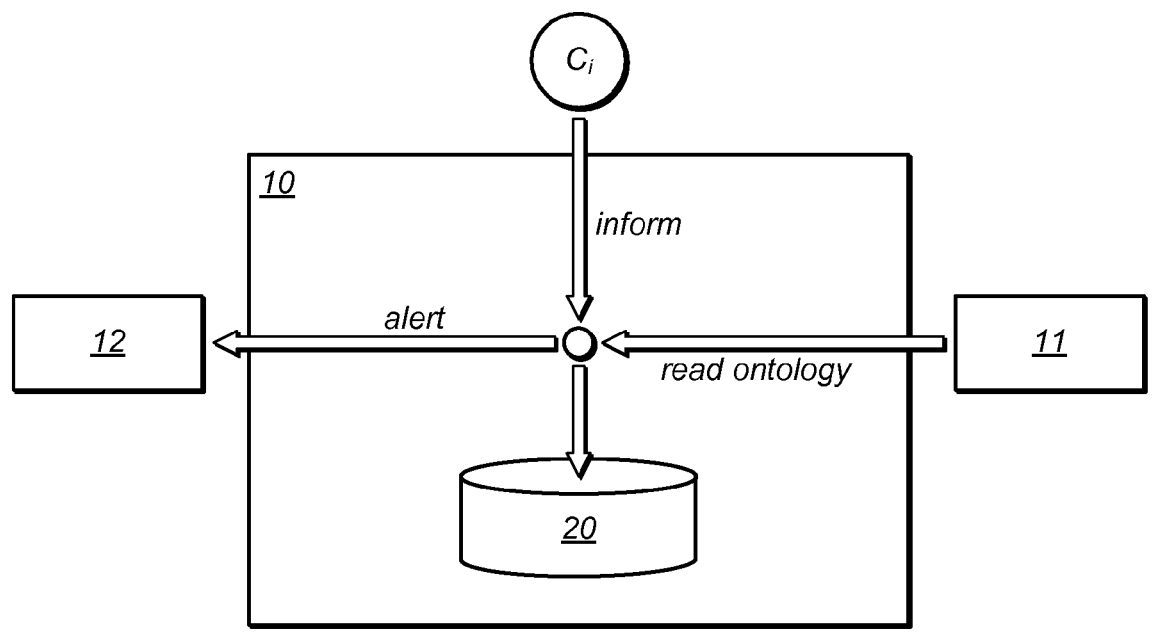
Figure 3:
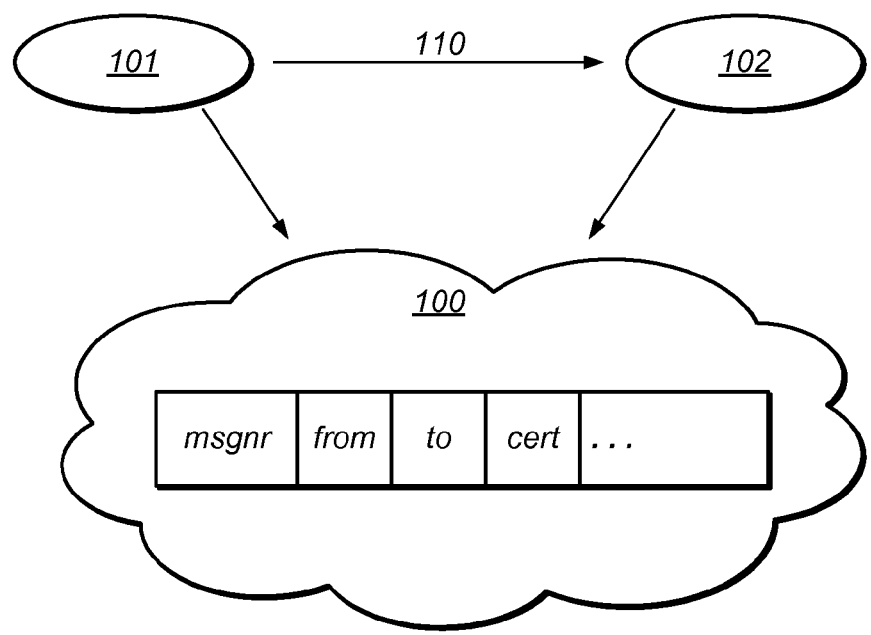
Figure 4:
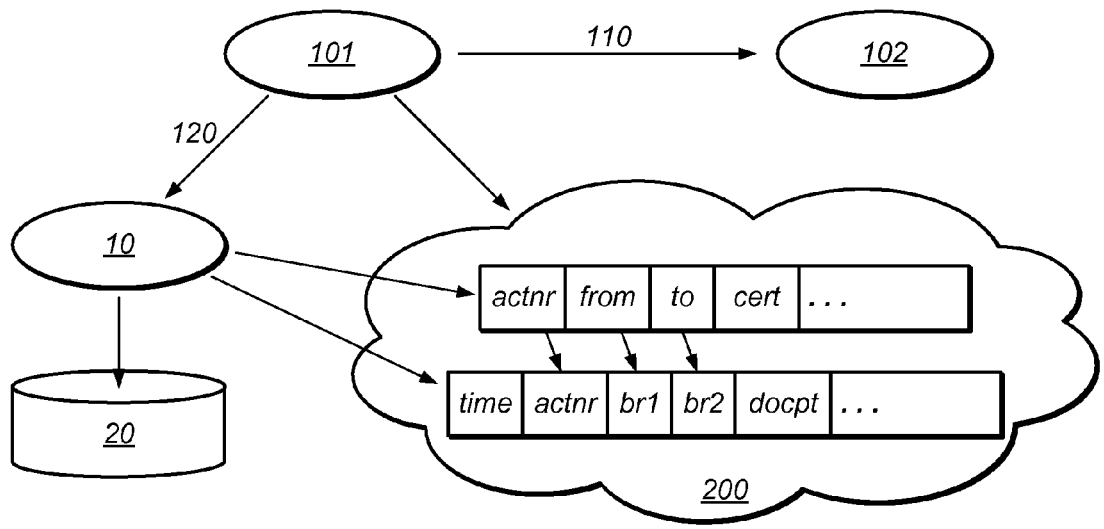

A better understanding of the present invention can be obtained when the following detailed description of the preferred embodiment is considered in conjunction with the following drawings, in which:

FIG. 1: An overview of an ontology driven SOA and a related monitoring system in accordance with one embodiment of the invention;

FIG. 2: A more detailed presentation of the monitoring system of FIG. 1 and the related flow of information, according to one embodiment;

FIG. 3: A schematic representation of an exemplary ontology governing the transfer of a business register in an exemplary embodiment of the invention;

FIG. 4: A schematic representation of the steps for monitoring the process shown in FIG. 3 in an embodiment of the invention; and FIG. 5: A schematic representation of the steps for reading the log entries created by the steps shown in FIG. 4.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In the following, various embodiments of a method for monitoring a software system (in particular a service oriented architecture software system) are described with respect to a software system 1 as schematically shown in FIG. 1. As can be seen, the software system 1 is based on an SOA, e.g., the processing is performed by separate components C1, C2, C3, . . . that communicate via messages. FIG. 1 presents additionally a monitoring component 10, which may be also loosely coupled, that is, it may be informed about what goes on in the software system 1 by receiving monitoring messages 5 and may react upon these by again sending messages. As will be explained below, it is possible to design the monitoring component 10 in a way that allows a maximum of flexibility of the monitoring operation. This may be achieved by defining the way the monitoring is performed, e.g., how to react upon which input, by one or more monitoring ontologies of a knowledge base 11.

Looking more in detail at FIG. 1, the main part of the overall environment is the software system 1 that the monitoring component 10 is supposed to monitor. The system 1 may include separate system components C1, C2, C3, . . . that communicate via messages. The system 1 might offer a querying and/or steering interface via a so-called "dashboard" 3. It also might do its work based on ontologies stored in a component called "knowledge base" 4. The dashboard 3 might also be able to look at the knowledge base 4 and update the ontologies stored therein.

The role of the monitoring component 10 may be to keep an eye on what is going on in the software system 1. This can mean two things. The first and most obvious task a monitoring component may perform is to write a log 20 (cf. FIG. 2), e.g., to track events happening in the software system 1 and, if such an event is considered note-worthy, turn it into a log entry and add it to the log 20. The other thing a monitoring component 10 can be used for is to react upon certain events with an alert. In a message-based architecture, alerting means sending a message to a non-monitor component, for example the dashboard 3 or another steering component such as the monitoring interface 12.

Since one of the main enhancements a message based software system 1 boasts is its flexibility with respect to changes of the processing logic and/or its implementation, the overall monitoring system should also be adaptive to changes. Such changes could be the following:

1. Which events (e.g., messages) are worth being tracked as a log entry?
2. Which information conveyed by such an event should be kept in the log entry?
3. How should the log entry be formatted?
4. Which events cause alerts?

5. Where should an alert message be sent to?
6. Which information should be contained in this alert message?
7. How should this alert message be formatted?

The monitoring system should be parameterizable with respect to these aspects. This may be achieved by providing the one or more ontologies of the knowledge base 11 (cf. FIG. 1). It is to be noted that the two knowledge bases 4 and 11 can be separate or be combined into a common overall knowledge base (not shown).

The first type of assistance the knowledge base 11 of the monitoring system may provide is a means of categorizing events in order to enable the log mechanism to decide what action is appropriate for a certain event. Other necessary meta-information may include mapping algorithms to describe how the information contained in an incoming message 5 has to be turned into log entries and/or alert messages. The last bit of information needed may be a pattern to describe where to send alerts to depending on the messages received.

With respect to the first aspect, categorizing an event can be done by two criteria, the message's sender and the message content. To avoid digging too deep into an incoming monitoring message 5 for a first categorization, there may be a small bit of information contained in the monitoring message 5 that is sufficient. The monitoring message 5 received by the monitor component 10 may represent an action undertaken by any of the system component C1, C2, C3, . . . about which the monitoring system may become informed (not all events may cause a monitoring message 5 to the monitoring component 10). The knowledge base 11 may keep a table of system components C1, C2, C3, . . . and their possible actions, which allows to infer, whether logging and/or alerting is required. Changing the software system 1 by adding/removing/renaming components C1, C2, C3, . . . or component's actions may require the updating of this information stored in the knowledge base 11.

For most purposes, a simple check upon a messages sender and the action it informs about may be sufficient to decide what to do. For example, a statement that every action A1 or A2 undertaken by one of the component C1 to C3 is worth being logged, makes sense. In other cases, however, a more thorough analysis might be appropriate. There might be an action A3 that, if undertaken by component C4 or C5 and adhering to a certain schema, may be dealt with by an alert. This implies a kind of pattern matching between incoming monitoring messages and patterns described by the ontologies in the knowledge base 11. Whichever way this is described, it implies that, in some embodiments, not only the possible actors in the system and their actions, but also the content and format of their monitoring messages 5 may be agreed upon. The logic that steers how to categorize an event is subtle and provide d by the ontologies of the knowledge base 11.

If an event, e.g., a monitoring message 5 informing about a system component C1, C2, C3, . . . having undertaken an action, is detected worth as being reacted upon, a number of questions arise. Which parts of the message should be packed into a log entry, respectively into an alert message, and how? If it is an alert, where is it addressed to? As already pointed out, the contents and formats of the incoming monitoring messages 5 may be known. Therefore, a mapping may be provided that describes how the incoming monitoring message 5 is transformed into the log entry or an alert message. In case of an alert, the address of the component to be informed may need to be found. There are two possibilities here. Firstly, it may be contained in the ontology that is used to detect a reason for alert. On the other hand it may be part of a mapping describing the alert message.

In the following, a small sample ontology of the knowledge base 11 is sketched to illustrate how its content can appear and how the monitor component 10 performs its work based on this information.

The exemplary system comprises five components C1 to C5 which may in total perform ten actions A1 to A10. Of course not every component may perform each of the ten events. The following table comprises the five components and the actions they can perform.

| Component | Actions |
| --- | --- |
| C1 | A1, A2, A3 |
| C2 | A1, A2, A3 |
| C3 | A1, A2, A3, A4 |
| C4 | A5 |
| C5 | A4, A5 |

In the present example, each component C1, C2, C3, . . . , when performing any action, sends a monitoring message 5 to the monitoring component 10 that at least contains the information who has performed the action and which action was performed. The message 5 additionally contains data describing the action in more detail. Thus, a typical monitoring message 5 sent to the monitoring component is 'C' followed by a number, 'A' followed by a number, and a data part. For the basic example, we assume that the data part's format only depends on the action, e.g., a specific action always manifests in a specific data part format independent of the component it was performed by. So our very first bit of one the ontologies of the knowledge base 11 may be a table that explains how to interpret the data part depending on the action.

| Ontology 1 | |
| --- | --- |
| Action | Data |
| A1 | ((field11, type11), (field12, type12), . . . ) |
| A2 | ((field21, type21), (field22, type22), . . . ) |
| A3 | . . . |
| etc. | |

Using the above ontology the monitoring component 10 may be now sufficiently smart to interpret the messages 5 data-wise. For simplicity, we assume that every system component C1, C2, C3, . . . , that sends a message to the monitoring component 10, wants this message to become a log entry. To keep the example even simpler, we assume that the log entry just keeps the data and only adds a time-stamp.

Now for the alerts: In its simplest form an alert is something like: 'If anybody is doing A1 tell R1'. Thus, a second ontology contains actions and recipients. Since this does not seem very useful yet we add some small support for pattern matching, saying 'If C1 is doing A1 and field 11 equals a constant "x" tell R1'. This alert ontology of the knowledge base 11 can be represented by the following table:

| Ontology 2 | | | |
|---|---|---|---|
| Component | Action | Pattern | Recipient |
| C1 | A1 | field11 = "x" | R1 |
|  | A2 | field21 > field31 | R2 |
| C2 | A1 | ... |  |
| etc. | | | |

We assume that sending an alert just means forwarding the message that causes the alert to the new recipient.

The two tables provided so far together with some assumptions already represent a model a monitoring component 10 can work with.

Extensions of the above described basic concept:

Saying that a component C1, C2, C3, . . . sends a monitoring message to the monitoring component 10 whenever it performs an action sounds as if these two things are supposed to happen at once. Apart from being technically challenging this does also not necessarily have to be the case. For a long action, it might be appropriate to send a message that the action has been started and another one that it has ended. This especially holds for actions that require human interaction and/or comprise sub-actions. The information about a started but still pending action could be stored in a temporary log, whereas the information about a finished action may be kept in a permanent log.

If two different components C1, C2, C3, . . . send a message about the same topic (e.g., action) these messages do not necessarily have to contain the same data component. Ontology 1 can be extended to make the data part definition depend on two keys.

The data part definition can be more flexible. For example, some of the rightmost fields may be optional. Asking whether an optional component is contained is then one of the possible questions being allowed in patterns in Ontology 2.

A third ontology 2 similar to ontology 2 (or an extension to ontology 2) becomes necessary, if the logging is not assumed to be of the "log all" kind.

Ontology 2 might contain more than one line per Component/Action pair in cases where there are multiple recipients and which one has to be informed depends on different patterns. The conditions that cause a recipient to be informed need not be mutual exclusive.

If a log entry should not be just a time-stamp plus a copy of the message, we need a mapping from messages to entries. This can be handled by adding appropriate information in ontology 1 containing a means of transformation. This can be a simple enumeration of fields contained in the respective message or a link to a style-sheet.

The same holds if an alert message should be more sophisticated. In this case the transformation specification needs to be added to Ontology 2.

With respect to the details of implementation, message oriented systems, especially if the services in question are Web services, typically use XML as both the message format and the message description format. Thus, XML also seems the format of choice for describing the ontologies, including the ontologies of the knowledge base 11 of the monitoring system. This is just as well since XML offers everything required for this purpose. Besides being able to store everything that can be described as a table, there are also specific XML dialects for describing ontologies, logical expressions as required in Ontology 2, and means of transformation.

Example

In the following, a concrete example of the monitoring technique of one embodiment is described with reference to an SOA software system designed to enable an electronic business register interoperability throughout Europe. In particular, the monitoring of a specific use case will be described to further facilitate the understanding of the various technical aspects and advantages of the monitoring system and method presented.

The use case, "Transfer of registered Office", describes how an enterprise moves its office from one member state of the EU to another. One step in this process is that the business register (BR) of the old member state informs the BR of the new member state about the fact that the enterprise has successfully applied for the allowance to move. Granting this right comes along with issuing a suitable legal document referred to as 'certificate'.

In a flexible SOA environment, the responsible organizations of the member states, between which these messages about issuing such a certificate are exchanged, may implement an overall software system wherein they agree upon the content and format of such a message by basing it on an ontology available to all. Thus, what exactly is sent and how this is packed into the message body is described independently from the software system itself. Thus, the system flexibly depends on an ontology and is easily updated in its behaviour by modifying this ontology.

The above described basic system is illustrated in FIG. 3. An ontology 100 might specify what the message 110 contains, for example, a message number (i.e. a key that specifies the kind of the message, here 'Information about Issued Certificate'), an indication of the sender 101 and the recipient 102 and possibly a pointer where the certificate the message 110 speaks of can be retrieved.

Monitoring the System (cf. FIG. 4)

The way in which the operation of such a software system is monitored may not restrict the flexibility achieved by basing the system's behaviour on ontologies such as the ontology 100 of FIG. 3. Thus, monitoring may also be performed by exchanging messages with format and content dynamically agreed upon using (further) ontologies. A system component, such as the sender 101, undertaking an action that requires to be noticed by a monitoring component 10 sends a monitoring message 120 to the monitoring component 10 (cf. FIG. 4). The content and format of the message 120 may be agreed upon by the monitoring component 10 and all participants which could possibly send such a message (e.g., undertaking such an action), as is the case with the non-monitoring messages also.

The monitoring component 10 may interpret the monitoring message 120 using the ontology 200 (cf. FIG. 4) and react accordingly. What exactly the monitoring component 10 is supposed to do with messages it receives, may be thus ruled by the ontology 200. The ontology 200 can for example describe that something is wrong, if an agency receives certificates indicating that an enterprise simultaneously moves to two member states. The ontology 200 may also specify which actions are to be taken when something occurs that is regarded noteworthy. One of the likely actions resulting from any monitoring message 120 is to manifest it as a log entry. Which information is exactly logged and in which format may again be based on the ontology 200 (or another ontology, not shown in FIG. 4).

In the concrete example of FIG. 4, the sender 101 (e.g., an agency working for a first member state), having sent the message 110 with the information about issuing a certificate to the receiver 102 (for example another agency managing the business register of the new member state), may send a monitoring message 120 to the monitoring component 10 saying that it has done so (cf. FIG. 4). The content and format of the monitoring message 120 may be agreed upon by the ontology 200 available to both the sender 101, the receiver 102 and the monitoring component 10.

In the example of FIG. 4, the monitoring message 120 may include an action number (or some other unique identifier identifying the kind of action that is documented by the message 120), the sender 101, the recipient 102, possibly a pointer to the sent certificate, and may be more, for example, information upon who exactly has done this, what additional information has been sent, what additional information was available but has not been sent, etc.

The ontology 200 of FIG. 4, which is accessed by the monitoring component 10, may include not only the agreements how messages like the monitoring message 120 that are possibly sent to the monitoring component 10 are to be interpreted. It may also provide all information which is necessary to react accordingly. For example, for those monitoring messages that require adding one or more log entries to a log 20, the ontology 200 especially includes information of how to transform the message into such a log entry. As can be seen from the schematic insert in the ontology 200 of FIG. 4, the information to be finally logged in the log 20 may include a timestamp, an indication of what activity is logged by reference to the action number, the participants of the action, possibly a pointer to a relevant document, etc.

Reading the Logs

Having written such defined log entries, the problem arises how the log 20 can afterwards be read via queries. It may be impossible to query the log 20 directly, since the structure of the data to be queried may be unknown to an external requester. Thus, a mechanism may be established to offer a query interface based upon the data model provided by an ontology describing the incoming messages. The mechanism may then use the mapping to the log format described by another ontology to transform the original query into another query suitable for the real log format. Having executed the transformed query upon the log 20, the result may be retransformed into a result suitable for responding to the original query.

Figure 5:
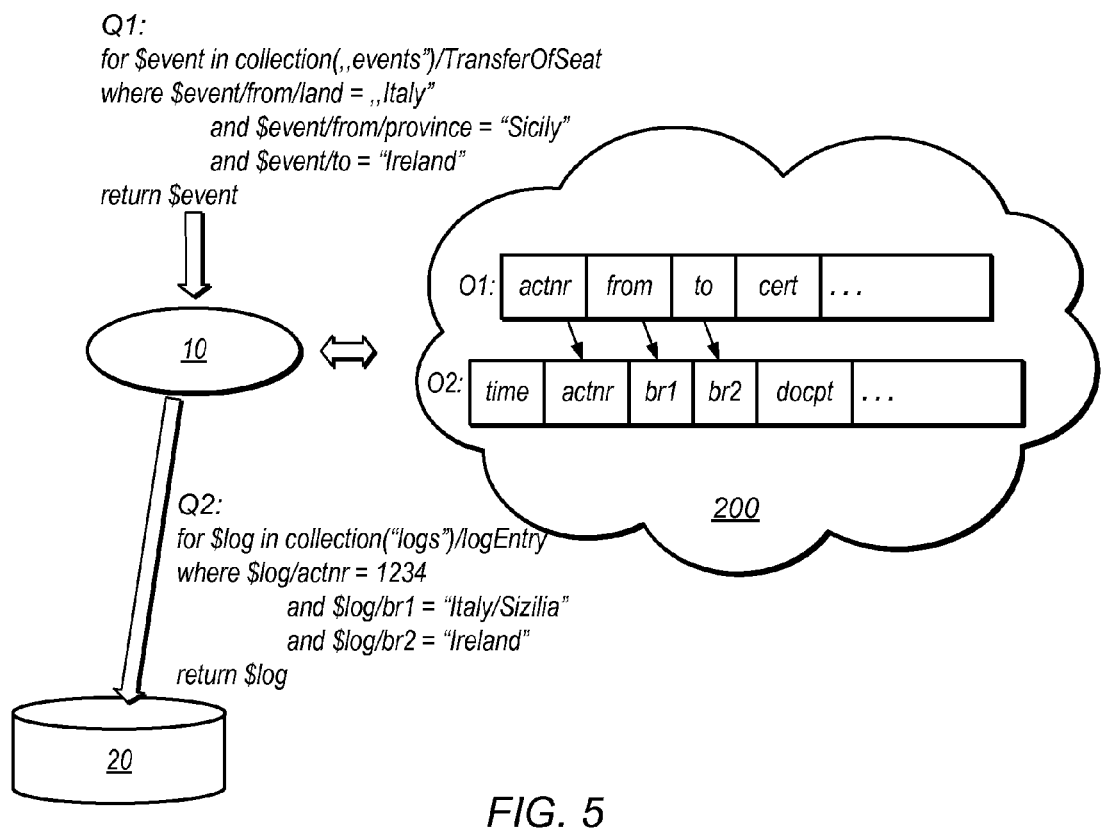

In the example of FIG. 5, the agency for the BR of Sicily may issue a certificate that a certain enterprise is allowed to move to Ireland. For some member states (as Italy), the states' BR activities are undertaken by several local agencies whereas in other member states (as Ireland) there is only one agency. So, when a company wants to move from Sicily, it contacts its local BR agency. When the move is granted from the Sicily agency (i.e. the certificate issued to the company), the agency managing the BR of Ireland is informed about the future move. Afterwards, the monitoring component 10 may be informed that such an action has taken place and (as defined by the ontology 200) a corresponding log entry may be created, as explained above with respect to FIG. 4.

If a person wants to get some information about moves from Sicily to Ireland, the following query Q1 seems appropriate:

```
for $event in collection("events")/TransferOfSeat
   where $event/from/land = "Italy"
      and $event/from/province = "Sicily"
      and $event/to = "Ireland"
   return $event
```

The query Q1 is written in XQuery, i.e., an XML query language by the W3C, which may be used in the context of the presently described method. However, this need not generally to be the case. Further, also the logs and other artifacts (especially the ontologies) need not necessarily to be in XML. The present example is based on both XML and XQuery, because it is most easily described thereby and also because it is considered an appropriate technology.

Apart from those parts in the query Q1 that are ruled by the XQuery standard (defining terms such as "for, where, collection, etc.") there are other bits that depend on how the data to be queried looks like (events, TransferOfSeat, from, land, department, to). These are not contained in the XQuery language set but are taken from meta-data pertaining to the data structure. In XML, such data is dealt with by XML Schema, another well-known W3C standard describing XML data structure.

The above presented exemplary query Q1 is directed towards the monitoring component 10. The monitoring component 10 may know which data fields exist (possibly by possessing an XML Schema as part of its ontology 200) and may thus be able to both offer a suitable language set to the querying device and decide whether the query Q1 makes sense. In the example, the monitoring component 10 may know that there is a collection called 'events' that contains 'TransferOfSeat' entries and how these entries look like.

Additionally, the monitor component 10 may know from its ontology 200 how to adapt the query Q1 to the format Q2 of the real log 20. Such a mapping might work as follows:

The log 20 represents events (as possibly almost everything else) as log entries.

A 'TransferOfSeat' is a log entry with a specific number identifying this kind of event.

For a log entry of this kind the 'from' and 'to' fields represent BR agencies.

The agencies for the BRs are represented by the names of the countries they belong to or (if the country has multiple BRs) the country plus the local BR's name separated by a slash.

The text constants pertaining to localities are translated to English in log entries; thus the constants in queries must be treated accordingly.

Thus the resulting query Q2 might look as follows:

```
for $log in collection("logs")/logEntry
   where $log/actnr = 1234
      and $log/br1 = "Italy/Sizilia"
      and $log/br2 = "Ireland"
   return $log
```

Having found the log entries corresponding to the query Q2, the result (a list of log entries) can be transformed back into the format requested by the original query Q1 (a list of events). This is achieved by inversely using the same information in the ontology 200 and the above described considerations used for transforming the query Q1.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method of monitoring a software system, wherein the method comprises:
receiving a monitoring message by a monitoring component, wherein the monitoring message comprises a unique identifier of a type of an event to be logged and is sent from a system component of the software system, and wherein the software system is based on a service oriented architecture (SOA) comprising system components communicating with each other via exchanging messages;

accessing a monitoring ontology of a knowledge base comprising at least one interpretation rule for interpreting the monitoring message by the monitoring component, wherein the monitoring ontology of the knowledge base includes agreements on how the monitoring message is to be interpreted and provides mapping information on how to transform the monitoring message into a log entry of a log; and storing monitoring message information in the log by the monitoring component in accordance with the at least one interpretation rule of the monitoring ontology of the knowledge base, wherein the at least one interpretation rule of the monitoring ontology of the knowledge base specifies whether the monitoring message information is logged by the monitoring component and specifies in which format the monitoring message information is logged by the monitoring component.

2. The method of claim 1, wherein a format and content of the messages exchanged between the system components of the software system is determined by another or the same monitoring ontology of the knowledge base.

3. The method of claim 1, wherein the monitoring ontology of the knowledge base is defined using at least one of the ontology languages OWL, RDF, DAML-OIL and Topic Maps.

4. The method of claim 1, wherein the monitoring message information is logged in a permanent log and a temporary log.

5. The method of claim 1, further comprising:
modifying the monitoring ontology of the knowledge base.

6. The method of claim 1, wherein the at least one interpretation rule of the monitoring ontology of the knowledge base specifies an alert message.

7. The method of claim 6, wherein the at least one interpretation rule of the monitoring ontology of the knowledge base defines a recipient of the alert message, content of the alert message, and a format of the alert message.

8. The method of claim 1, further comprising:
receiving a query message comprising a query for content of the log by the monitoring component, the query being in accordance with the at least one interpretation rule of the monitoring ontology of the knowledge base accessible by the monitoring component;

mapping the query message into a query format suitable for the log, wherein the mapping comprises mapping the query message based on at least one interpretation rule of another or the same monitoring ontology of the knowledge base accessible by the monitoring component; and executing the query and returning the results of the execution after mapping them into an output format based on the at least one interpretation rule of the another or the same monitoring ontology of the knowledge base accessible by the monitoring component.

9. The method of claim 8, wherein the query message comprises an XQuery message.

10. The method of claim 9, wherein the another or the same monitoring ontology of the knowledge base comprises at least one Extensible Markup Language (XML) Schema defining data structures for the query message and the query format suitable for the log.

11. The method of claim 8, wherein the mapping comprises mapping an event contained in the query message to a log entry of the log based on a unique identifier of a type of an event.

12. A computer readable memory medium storing program instructions for monitoring a software system, wherein the program instructions are executable by a processor to:

receive a monitoring message by a monitoring component, wherein the monitoring message comprises a unique identifier of a type of an event to be logged and is sent from a system component of the software system, and wherein the software system is based on a service oriented architecture (SOA) comprising system components communicating with each other via exchanging messages;

access a monitoring ontology of a knowledge base comprising at least one interpretation rule for interpreting the monitoring message by the monitoring component, wherein the monitoring ontology of the knowledge base includes agreements on how the monitoring message is to be interpreted and provides mapping information on how to transform the monitoring message into a log entry of a log; and store monitoring message information in the log by the monitoring component in accordance with the at least one interpretation rule of the monitoring ontology of the knowledge base, wherein the at least one interpretation rule of the monitoring ontology of the knowledge base specifies whether the monitoring message information is logged by the monitoring component and specifies in which format the monitoring message information is logged by the monitoring component.

13. The computer readable memory medium of claim 12, wherein a format and content of the messages exchanged between the system components of the software system is determined by another or the same monitoring ontology of the knowledge base.

14. The computer readable memory medium of claim 12, wherein the monitoring ontology of the knowledge base is defined using at least one of the ontology languages OWL, RDF, DAML-OIL and Topic Maps.

15. The computer readable memory medium of claim 12, wherein the monitoring message information is logged in a permanent log and a temporary log.

16. The computer readable memory medium of claim 12, wherein the program instructions are further executable to:
modify the monitoring ontology of the knowledge base.

17. The computer readable memory medium of claim 12, wherein the at least one interpretation rule of the monitoring ontology of the knowledge base specifies an alert message.

18. The computer readable memory medium of claim 17, wherein the at least one interpretation rule of the monitoring ontology of the knowledge base defines a recipient of the alert message, content of the alert message, and a format of the alert message.

19. The computer readable memory medium of claim 12, wherein the program instructions are further executable to:
receive a query message comprising a query for content of the log by the monitoring component, the query being in accordance with the at least one interpretation rule of the monitoring ontology of the knowledge base accessible by the monitoring component;

map the query message into a query format suitable for the log, wherein the mapping comprises mapping the query message based on at least one interpretation rule of another or the same monitoring ontology of the knowledge base accessible by the monitoring component; and execute the query and returning the results of the execution after mapping them into an output format based on the at least one interpretation rule of the another or the same monitoring ontology of the knowledge base accessible by the monitoring component.

20. The computer readable memory medium of claim 19, wherein the query message comprises an XQuery message.

21. The computer readable memory medium of claim 20, wherein the another or the same monitoring ontology of the knowledge base comprises at least one Extensible Markup Language (XML) Schema defining data structures for the query message and the query format suitable for the log.

22. The computer readable memory medium of claim 19, wherein the mapping comprises mapping an event contained in the query message to a log entry of the log based on a unique identifier of a type of an event.

23. A system for monitoring a software system, wherein the system comprises:
one or more processors; and
a memory medium coupled to the one or more processors, wherein the memory medium stores program instructions executable by the one or more processors to:
receive a monitoring message by a monitoring component, wherein the monitoring message comprises a unique identifier of a type of an event to be logged and is sent from a system component of the software system, and wherein the software system is based on a service oriented architecture (SOA) comprising system components communicating with each other via exchanging messages;
access a monitoring ontology of a knowledge base comprising at least one interpretation rule for interpreting the monitoring message by the monitoring component, wherein the monitoring ontology of the knowledge base includes agreements on how the monitoring message is to be interpreted and provides mapping information on how to transform the monitoring message into a log entry of a log; and
store monitoring message information in the log by the monitoring component in accordance with the at least one interpretation rule of the monitoring ontology of the knowledge base, wherein the at least one interpretation rule of the monitoring ontology of the knowledge base specifies whether the monitoring message information is logged by the monitoring component and specifies in which format the monitoring message information is logged by the monitoring component.

* * * * *

UNITED STATES PATENT AND TRADEMARK OFFICE
CERTIFICATE OF CORRECTION

PATENT NO.         : 8,230,398 B2
APPLICATION NO.    : 12/014182
DATED              : July 24, 2012
INVENTOR(S)        : Andreas Flohlich et al.

It is certified that error appears in the above-identified patent and that said Letters Patent is hereby corrected as shown below:

In the Claims:

COLUMN 12, Line 64 (Claim 19.), please delete "log, wherein the mapping comprises mapping the query" and substitute -- log, including mapping the query --.

COLUMN 13, Line 1 (Claim 19.), please delete "execute the query and returning the results" and substitute -- execute the query and return results --.

COLUMN 13, Line 2 (Claim 19.), please delete "mapping them" and substitute -- mapping the results --.

COLUMN 13, Line 14 (Claim 22.), please delete "wherein the mapping comprises mapping" and substitute -- wherein to map the query message into a query format, the program instructions are further executable to map --.

Signed and Sealed this
Thirteenth Day of November, 2012

David J. Kappos
*Director of the United States Patent and Trademark Office*

UNITED STATES PATENT AND TRADEMARK OFFICE
CERTIFICATE OF CORRECTION

PATENT NO.         : 8,230,398 B2
APPLICATION NO.    : 12/014182
DATED              : July 24, 2012
INVENTOR(S)        : Andreas Fröhlich et al.

It is certified that error appears in the above-identified patent and that said Letters Patent is hereby corrected as shown below:

In the Claims:

COLUMN 12, Line 64 (Claim 19.), please delete "log, wherein the mapping comprises mapping the query" and substitute -- log, including mapping the query --.

COLUMN 13, Line 1 (Claim 19.), please delete "execute the query and returning the results" and substitute -- execute the query and return results --.

COLUMN 13, Line 2 (Claim 19.), please delete "mapping them" and substitute
-- mapping the results --.

COLUMN 13, Line 14 (Claim 22.), please delete "wherein the mapping comprises mapping" and substitute -- wherein to map the query message into a query format, the program instructions are further executable to map --.

This certificate supersedes the Certificate of Correction issued November 13, 2012.

Signed and Sealed this
Eighth Day of January, 2013

David J. Kappos
*Director of the United States Patent and Trademark Office*